United States Patent [19]

Moore

[11] 3,936,626
[45] Feb. 3, 1976

[54] METHOD OF HEATING COMESTIBLES
[75] Inventor: Donald G. Moore, Glencoe, Ill.
[73] Assignee: Chemetron Corporation, Chicago, Ill.
[22] Filed: Oct. 25, 1972
[21] Appl. No.: 300,763

[52] U.S. Cl. ... 219/10.55 M; 219/10.55 E; 426/241
[51] Int. Cl.² .......................................... H05B 9/06
[58] Field of Search..219/10.55 M, 10.55 E, 10.55 C, 219/10.55 R, 10.55 D, 10.55 F; 335/146, 208; 426/241

[56] References Cited
UNITED STATES PATENTS

| 1,975,437 | 10/1934 | Sorrel | 219/10.49 |
| 2,540,527 | 2/1951 | Ingels | 340/228 F |
| 2,830,162 | 4/1958 | Copson et al. | 219/10.55 E |
| 3,218,957 | 11/1965 | Fernell | 219/10.55 E |
| 3,353,968 | 11/1967 | Krajewski | 219/10.55 E |
| 3,523,170 | 8/1970 | Boehm | 219/10.55 B |
| 3,534,306 | 10/1970 | Waltrous et al. | 335/146 |
| 3,547,661 | 12/1970 | Stevenson | 219/10.55 E |
| 3,602,851 | 8/1971 | Wiegand | 335/146 |
| 3,615,713 | 10/1971 | Stevenson | 219/10.55 E |
| 3,662,140 | 5/1972 | Jones | 219/10.55 B |
| 3,760,310 | 9/1973 | Carson | 335/146 |

Primary Examiner—Bruce A. Reynolds
Attorney, Agent, or Firm—N. M. Esser

[57] ABSTRACT

A system for thermally reconstituting plural item meals in an oven with a cavity to which electromagnetic energy is supplied uses differently shielded or unshielded food containers to partially control the energy received by each food item from the cavity so as to place all of the items in a condition for consumption in the same controllable time interval. A template carried on a tray positions the food items relative to each other and to the cavity so as to further control the energy distribution to the food items. An electromagnetic energy sampling sensor carried on the tray automatically terminates the heating cycle. In one oven control, the sensor carried on the tray is a magnetic or ferrite mass which controls a magnetically responsive switch mounted in the oven to initiate the heating cycle and which is heated to its Curie point when the food items are properly heated to release the switch and terminate the heating cycle. The described method of preparing the plural item meal on the tray includes the steps of positioning the food items on the tray to distribute between them the energy available in the cavity, repositioning the items to compensate for changed cavity energy distribution resulting from the first positioning of the items on the tray, and positioning the sensor on the tray such that it reaches its Curie point when all of the template located food components reach a condition suitable for consumption.

5 Claims, 8 Drawing Figures

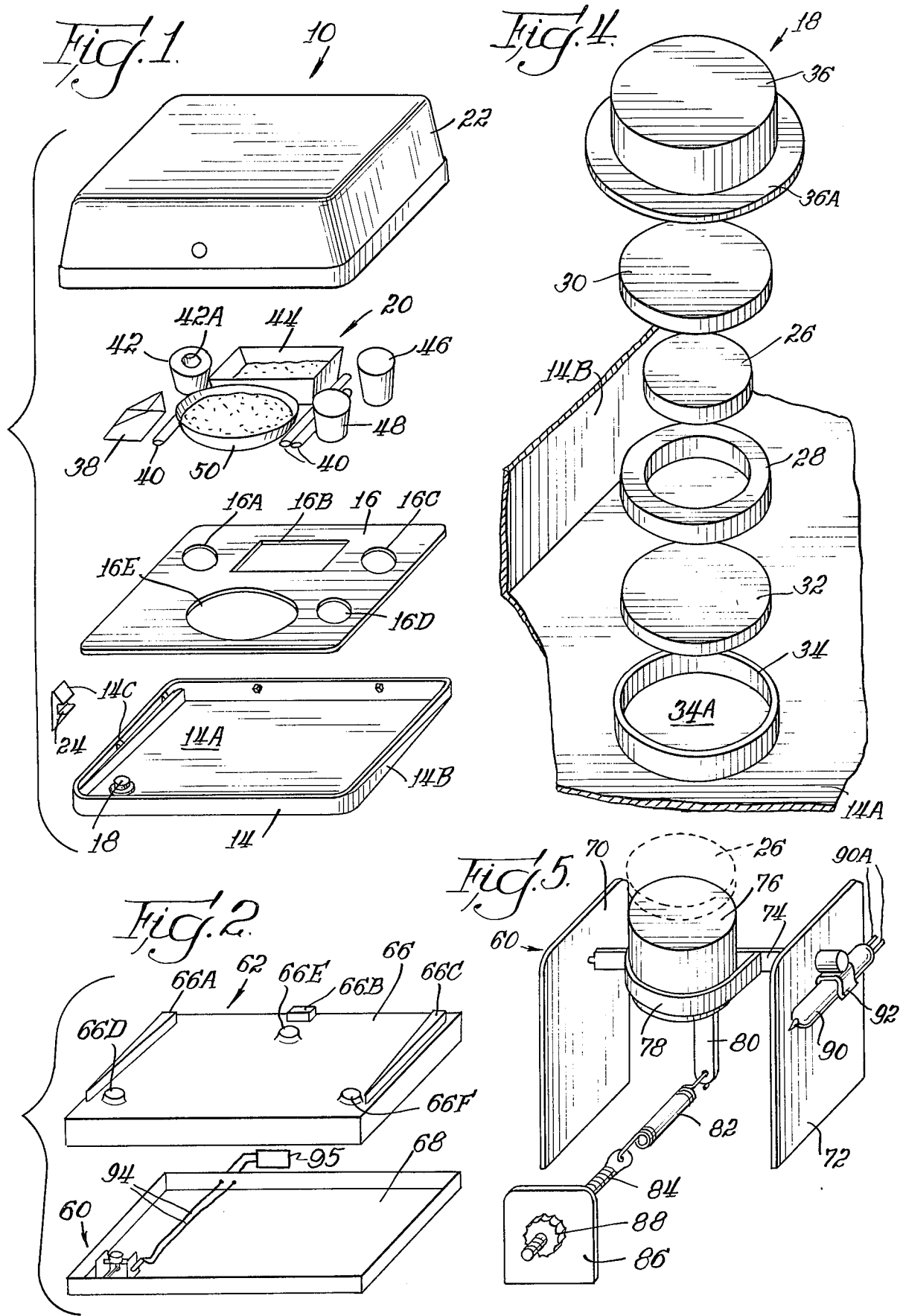

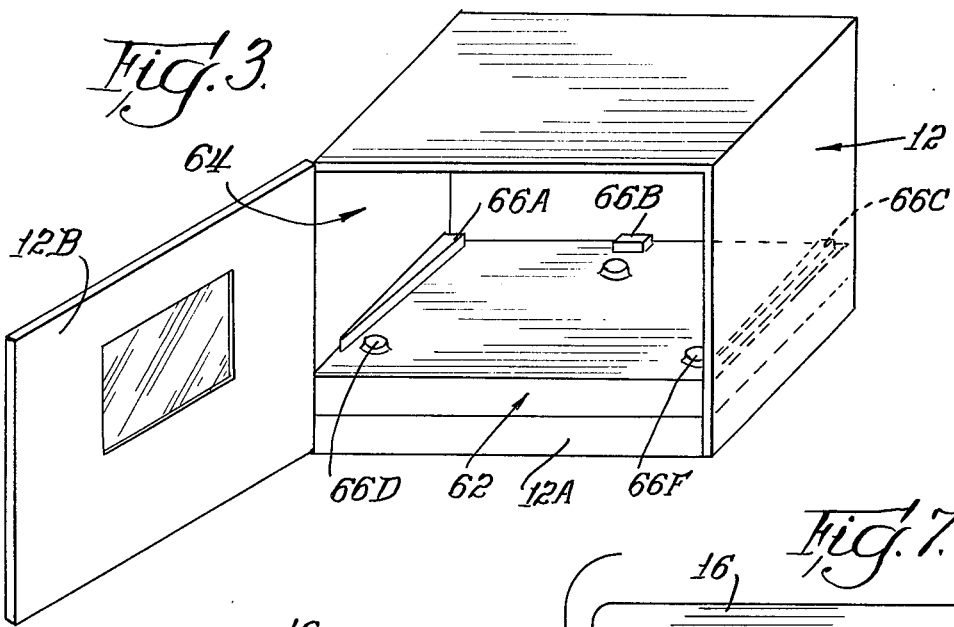
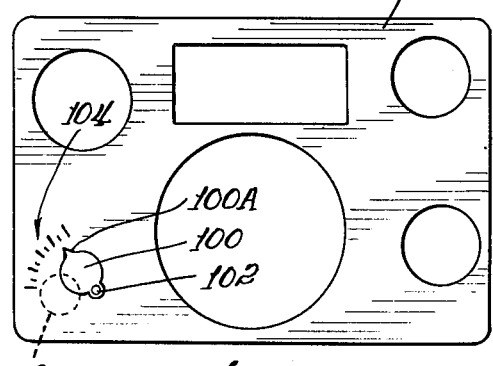
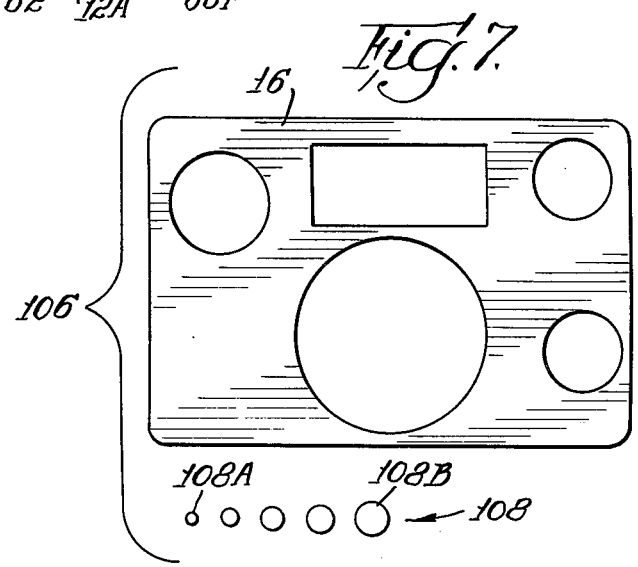
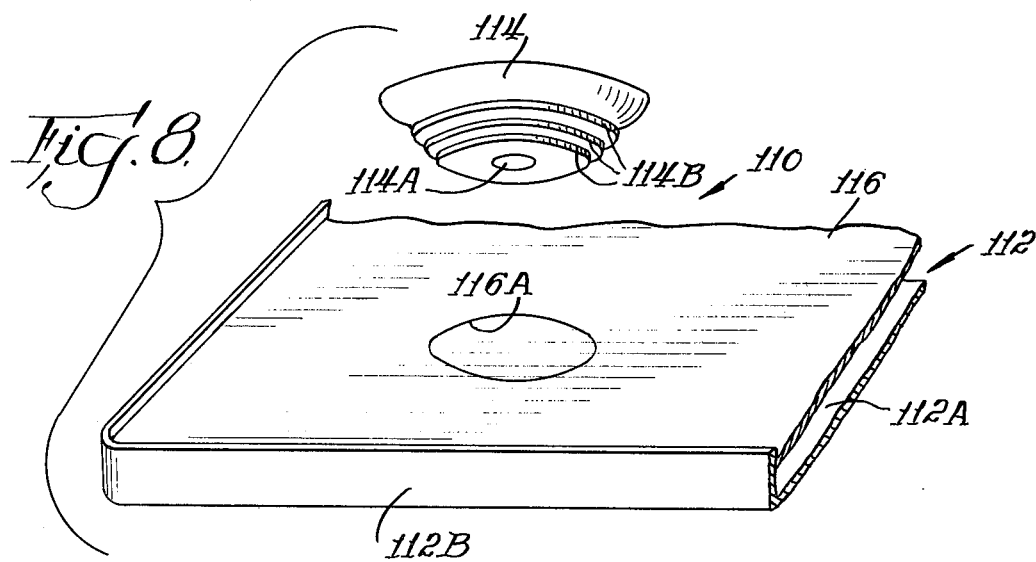

METHOD OF HEATING COMESTIBLES

The present invention relates to a system for and a method of heating comestibles and, more particularly, to a system for and a method of automatically effecting the thermal reconstitution of all food items in a plural item meal simultaneously.

Electromagnetic heating techniques for heating food products or reconstituting frozen meals have been used for some time with varying results. With plural component meals, the obvious problem of having all of the food components reach a condition suitable for consumption at the same time has brought forth a large number of proposed solutions. These commonly involve the selective shielding of the food loads in the cavity of the oven, as by the use of special food containers or trays, or the use of energy concentrating materials adjacent to the food loads. When these techniques are used in conjunction with individually packaged food items which are then placed in a common tray and inserted into the oven cavity, the expected proper heating of the different items within the same time period frequently is not realized.

This can be due to changes in the energy absorption by the various loads resulting from competition between the various loads for the available cavity energy. It can also be due to the changes in the modal structure or intensity within the cavity resulting from the insertion of the food loads.

A certain amount of variation in heating can be tolerated when the oven is subjected to occasional use, as in the home, but presents a substantial problem in such high volume applications as restaurants or institutional feeding. This institutional use of electromagnetic energy ovens poses an additional problem. A domestic user can, by use of the oven over a period of time with various food loads, begin to predict the duration of the heating cycle required for different food loads. In an institution, however, the changes in and lack of experience of the personnel, unpredictable variations in operating conditions, and the necessity of delivering a large volume of meals at a more or less uniform standard militate against the use of "cut and try" techniques.

Accordingly, one object of this invention is to provide a new and improved system for and method of heating articles.

Another object is to provide a system for and a method of heating one or more articles wherein an electromagnetic energy sensor spaced from thermal contact with the articles automatically controls the article heating operation.

A further object is to provide a system for automatically heating a plural component meal in the cavity of an electromagnetic oven wherein an electromagnetic sensor for the meal automatically regulates the heating of the meal.

Another object is to provide an assembly of food items in containers on a tray carrying an electromagnetic sensor wherein the food containers and sensor are so formed and positioned that the sensor can effect automatic termination of a heating cycle when all of the food items are suitable for consumption.

A further object is to provide a method of preparing meals for being simultaneously heated to a condition suitable for consumption wherein the food items are selectively shielded and disposed relative to each other and a sensor such that the relative distribution of energy between the loads (including the sensor) when the tray is inserted into a oven cavity produces the desired heating of each food item concurrently with the response of the sensor to indicate the end of the heating interval.

In accordance with these and many other objects, an embodiment of the invention comprises a method of and an apparatus or system for automatically heating a single or multicomponent load to a suitable condition. In an application involving the thermal reconstitution of plural item meals, a tray or carrier is provided with a removable template for detachably positioning selectively shielded food item containers in predetermined positions relative to each other and to an electromagnetic energy sensor carried on the tray. The template is prepared taking into consideration the nature of the food loads, the effect of competition between the loads for energy available in a given oven cavity, and any redistribution of cavity energy resulting from introduction of the loads so that the sensor provides an indication when sufficient energy has been imparted to the meal to bring all of the components to a condition suitable for consumption. In an illustrated embodiment, the electromagnetic sensor comprises a mass of magnetic or ferrite material so proportioned, shielded, or located relative to the tray and food components that its Curie point is reached or exceeded when all of the components of the meal are ready for consumption.

The electromagnetic energy oven is provided with a magnetically responsive control such as a switch which is operated by the sensor on a tray when the tray is inserted into the oven cavity to initiate the heating cycle. When the heat imparted to the food load including the sensor is such that the individual food items are ready for consumption, the Curie point of the sensor is exceeded, and the control releases the switching means to terminate the heating operation. If desired, the tray can be left in the oven during which time the sensor cools to effect equalization of the heat distribution within the various items. Upon cooling, the permeability of the sensor returns, and the oven is again energized to provide a second heating interval controlled by the sensor. This second heating interval following the equalization cycle is generally of short duration, and the meal can be removed from the oven when the second cycle is terminated by the sensor. The food temperature will be maintained by oven cycling until the meal is removed.

In preparing the assembly of food items on the tray in accordance with the method of the present invention, the individual food containers are selectively shielded using techniques well known in the art so that each food item will be heated to a temperature suitable for consumption in approximately the same period of time. These shielded food items are then placed on a tray within the oven together with a sensor. Their relative positions are adjusted, taking into account the competition between loads for energy available in the cavity and any redistribution of the energy within the cavity until such time as all of the food items are properly heated at the same time that the ferrite material exceeds its Curie point. Reuseable or disposable templates are then prepared for the meal which can be detachably mounted on the tray or carrier to hold the food containers in desired position relative to each other and to the sensor. In this way, a single tray can be used for heating and serving a large number of meals, and templates for different meals can be used with a common supporting tray or carrier. Further, in certain embodiments, additional control means on the templates are provided for controlling the amount of electromagnetic energy coupled to the sensor so as to provide different heating intervals. These controls can include movable mounted conductive segments on the template in proximity to the sensor or adhesively secured electrically conductive segments.

Many other objects and advantages of the present invention will become apparent from considering the following detailed description in conjunction with the drawings in which:

FIG. 1 is an exploded perspective view of a food tray assembly embodying the present invention;

FIG. 2 is an exploded perspective view of a control for an electromagnetic oven responsive to control by the tray assembly shown in FIG. 1;

FIG. 3 is a perspective view of an oven illustrating the relative position of the control shown in FIG. 2;

FIG. 4 is an exploded perspective view of an electromagnetic sensor for the tray assembly shown in FIG. 1;

FIG. 5 is a perspective view of a portion of the oven control shown in FIG. 2;

FIG. 6 illustrates one modification of a template used in the tray assembly of FIG. 1;

FIG. 7 is an exploded view of another embodiment of the template designed for use in the tray assembly of FIG. 1; and FIG. 8 is an exploded perspective view of a portion of the tray and a modified food container adapted for use with the tray assembly of FIG. 1.

Referring now more specifically to the drawings, therein is illustrated a tray assembly indicated generally as 10 for a multicomponent meal which embodies the present invention and which is adapted to be heated in a conventional electromagnetic energy oven indicated generally as 12. The tray assembly 10 is so constructed that the individual food items of the meal are placed in a condition suitable for consumption within a time period determined by a sensor forming a part of the assembly 10 which automatically terminates the heating cycle of the oven 12.

The assembly 10 includes a supporting carrier, base, or tray 14 in which is detachably mounted a template or locating means 16 having a plurality of openings therein for maintaining in fixed positions relative to each other and to a sensor indicated generally as 18 the components of a complete meal which is indicated generally as 20. A cover 22 which normally rests on the base or tray 14 covers the components 20 of the meal during storage, transportation, and thermal reconstitution. It can be used following consumption of the meal as a means for transporting waste material.

Referring now more specifically to the construction of the tray or carrier 14, this tray can be either transparent or opaque to electromagnetic energy, and in one embodiment is made opaque to radiation by laminating aluminum screen between layers of material such as polystyrene. The tray 14 is illustrated as having a generally flat lower wall 14A with four side walls 14B upstanding therefrom to define a generally rectangular cavity, in one corner of which is disposed the electromagnetic energy sensor assembly 18. The four side walls 14B include bosses or projecting portions 14C defining a slot 24. The spaced projecting portions 14C provide means for detachably mounting the template 16 on the tray 14 closing the cavity by the insertion of the edges of this template into the slots 24 in the spaced projecting portions 14C.

The sensor assembly 18 receives a determined part of the energy imparted to the food load by the oven 12 and has the characteristic that it provides an indication such as a change of property when the total quantity of heat imparted to the meal is sufficient to bring the components thereof to a temperature suitable for consumption. The illustrated sensor assembly 18 includes a cylindrical body 26 of magnetic material such as ferrite, and the body 26 is so located and shielded from or alternatively provided with access to electromagnetic energy that when the components of the meal have been heated to the degree proper to each, the body 26 exceeds its Curie point and its permeability drops appreciably. This change in characteristic provides a control for the oven 12 to automatically terminate the heating cycle.

In the illustrated embodiment of the sensor 18, the magnetic or ferrite body 26 is disposed within an annular body or ring 28 interposed between a pair of cylindrical bodies or plates 30 and 32. The components 28, 30, and 32 are formed of heat resistant, nonmagnetic material that is both electrically and thermally insulating. These assembled components are disposed within an electrically conducting, nonmagnetic cup 34 having a lower wall 34A resting on the lower wall 14A of the tray. These components are enclosed by a cap 36 having a flanged lower end 36A. These components are secured together and in a desired location on the wall 14A of the tray by suitable means such as an epoxy cement. Since the cup 34 is made of electrically conducting material, the ferrite body 26 is shielded from electromagnetic radiation over a substantial extent but can receive this radiation through the elctrically insulating enclosure or cap 36.

The template 16 can be formed of any suitable material but preferably is formed of low cost material such as cardboard so as to be disposable after use with each meal. The template 16 is detachably mounted on the tray or tray base 14 by the plurality of projecting portions 14C formed on the walls 14B of the tray. When assembled with the tray 14, the template 16 closes the cavity defined by the side walls 14B and completes the enclosure of the sensor assembly 18. The template 16 is provided with a plurality of apertures or locating openings 16A-16E for receiving and holding in fixed positions relative to each other and to the sensor assembly 18 individual containers for a plurality of food items in the meal to be heated. The manner of and criteria for establishing the positions of the openings 16A–16E is set forth in detail below. In general, however, these openings locate the components of the meal with respect to each other and to the oven cavity and to the sensor 18 so that when the magnetic material 26 in the sensor assembly 18 exceeds its Curie point, each of the individual components of the meal is in a condition suitable for consumption.

The components of a representative or illustrative meal are indicated generally as 20 in FIG. 1 of the drawings. In addition to such noncomestible items as a napkin 38 and cutlery 40, the meal components include receptacles 42, 44, 46, 48, and 50 containing, respectively, a dinner roll, potato, ice cream, butter, and a meat item such as Salisbury steak. To facilitate institutional processing of the meals, the containers and the respective food items are prepared, refrigerated, and maintained in storage at any suitable temperature such as 0°F. or 40°F. These and similar items can be maintained in storage and assembled on the trays 14 using suitable templates 16 prior to reconstitution and serving. The containers 42, 44, 46, 48, and 50 are so designed that all of these items are placed in a condition for serving at the end of the same heating cycle. However, as noted above, even though these containers are designed to this end criteria, the desired result frequently is not obtained when the individual containers are collectively presented as a load to the oven 12.

The construction of the individual food containers or receptacles is not shown or described in detail inasmuch as many techniques for controlling the transfer of electromagnetic energy to food loads are well known in the art. Briefly, however, the dinner roll container 42 can comprise an aluminum body having a top aperture 42A for coupling sufficient energy to the dinner roll to permit it to become warm. The container 42 also preferably includes a foam thermally insulating liner to reduce reradiation of thermal energy. The potato dish or container 44 can be made of heavy paper that is essentially transparent to electromagnetic radiation. The ice cream container 46 is completely shielded with aluminum or other electrically conductive material and includes a foam thermally insulating liner. The butter container 48 can comprise a member that is formed completely of electrically conducting or radiation shielding material except for an open top. The meat container 50 is formed completely of electrically nonconductive material which is essentially transparent to electromagnetic energy.

As noted above, the provision of different amounts of shielding on the various containers 42, 44, 46, 48, and 50 provides a rough or first approximation of control over the amount of energy supplied to the individual food loads during a heating operation, and these containers are so designed as to attempt to place the respective food items in condition for consumption at the end of a common heating period. These containers are positioned in predetermined locations relative to each other by the insertion of the containers 42, 44, 46, 48, and 50 into the locating openings 16A–16E, respectively, of the template 16. This fixed positioning of the electrical loads relative to each other and to the sensor 18 provides a further control over the degree of energy imparted to each of the food loads resulting from mutual competition for the energy available in the cavity of the oven 12 and distortions or alterations of the energy distribution in this cavity resulting from the introduction of a tray 14 containing the meal components 20 into the cavity of the oven 12.

Referring now more specifically to the oven 12, there is provided a control assembly indicated generally as 60 (FIG. 5) disposed within a housing 62 (FIG. 2) and disposed within the oven 12 to define the lower wall of a cooking cavity 64 for the oven 12. The housing 62 could be made as the bottom wall of the oven 12. The control 60 is controlled by the sensor assembly 18 to initiate a heating cycle of the oven 12 when a tray 14 is inserted into the cavity 64 and to terminate the heating cycle of the oven 12 when all of the components of the meal 20 have been placed in a condition suitable for consumption. The housing 62 enclosing the control assembly 60 is formed of two nonmagnetic and electrically conducting or radiation shielding elements 66 and 68. The elements 66 and 68 each defining oppositely facing box-like members are assembled in telescoping relation providing an enclosure in which the control assembly 60 is located. The housing 62 is disposed within the cavity 64 (FIG. 3) resting on a base portion 12A of the oven 12. The top member 66 is provided with three guide portions 66A, 66B, and 66C, two of which 66A and 66C are tapered to insure proper positioning of the tray 14 within the cavity 64 by engaging corresponding tapered edges on the side walls 14B. In addition, this top member 66 is provided with three dimples or bumps 66D–66F somewhat lower than the guide portions 66A–66C to provide a three-point warp insensitive support for this tray. The protuberance, bump, or projection 66D is disposed directly above the control assembly 60 and immediately below the sensor 18 when a tray 14 is positioned within the oven cavity 64 by the edge guides 66A–66C.

The control assembly 60 (FIG. 5) includes a pair of supporting brackets or arms 70, 72 secured to the base structure 68 of the housing 62. A pivot arm 74 extends between and is pivotally mounted on the supports 70, 72. A permanent magnet 76 illustrated as cylindrical in configuration is secured to a midpoint of the pivot arm 74 as by a fastening band or clamp 78 so that the upper end of the permanent magnet 76 is disposed within the dimple or protuberance 66D on the upper housing member 66 and underlying the ferrite mass 26 shown in dot-and-dash outline when a tray 14 is disposed within the oven cavity 64. Because of the nonmagnetic nature of the enclosures for the ferrite 26 and the permanent magnet 76 and due to the disposition of the upper end of the magnet 76 within the protuberance 66D, efficient magnetic coupling is provided between the ferrite body 26 and the permanent magnet 76.

Since the permanent magnet 76 is eccentrically disposed with respect to the pivotal axis of the arm 74, an arm 80 is provided secured to the arm 74 and depending therefrom. The lower end of the arm 80 is connected to one end of a tension spring 82, the other end of which is connected to a lead screw 84 passing through a support 86 secured to the lower wall of the housing structure 68. A thumb screw 88 bearing against the arm 86 and threadedly engaged with the free end of the lead screw 84 provides means for manually adjusting the resilient bias applied by the spring 82 to the arm 80. This bias is so adjusted that the counterclockwise moment about the pivotal axis of the arm 74 due to the off-center disposition of the permanent magnet 76 is substantially counterbalanced, although permitting the magnet 76 to occupy a normal position displaced downwardly somewhat from horizontal.

To provide means for controlling the heating cycle of the oven 12, the control 60 includes a mercury switch capsule 90 secured to a projecting end of the pivot arm 74 by a bracket or clamp 92. The switch capsule 90 is one well known in the art and can include, for example, a body of mercury disposed within a sealed glass housing from one end of which extend a pair of electrically conductive terminal pins 90A. These pins are connected by conductors 94 (FIG. 2) lying within the cavity defined by the housing members 66, 68 to a plug or receptacle which is coupled to the on-off control for the oven 12 when the assembly 60 is disposed within the cavity 64 (FIG. 3).

In the normal condition of the control assembly 60, the magnet 76 and the mercury switch 90 are disposed in a position set by the bias spring 82 deflected slightly in a counterclockwise direction about the axis of the pivot arm 94 so that the terminal pins 90A of the mercury switch 90 are elevated with respect to the opposite end of this capsule. This means that the switch 90 is in an open circuit condition because the liquid mercury is not bridging the contacts or terminals 90A. When, however, a tray 14 is inserted into the oven cavity 64 so that the sensor assembly 18 overlies the permanent magnet 76 with the ferrite body 26 in the position illustrated in dot-and-dash outline in FIG. 5, the magnetic coupling between the members 26 and 76 pivots the pivot arm 74 in a clockwise direction about its axis so that the switch 90 is also moved in a clockwise direction, and the end of the switch 90 containing the terminal pins 90A is displaced below the opposite end of this switch. The body of liquid mercury contained within the switch 90 moves into engagement with the interior ends of the terminal pins 90A and establishes an electrically conductive circuit over the wires 94. This circuit prepares a control unit 95 for the oven 12 to initiate a heating cycle.

As set forth above, the sensor assembly 18 utilizes the attainment of the Curie point by the ferrite body 26 as an indication that the heating cycle should be terminated. When the Curie point is exceeded, the ferrite body 26 changes from a ferromagnetic material to a paramagnetic material. This means that the magnetic force coupling bodies 26 and 76 becomes substantially reduced, and the mass of the permanent magnet 76 is effective to pivot this magnetic member and the mercury switch 90 in a counterclockwise direction (FIG. 5) around the pivotal axis of the arm 74 so that electrical continuity between the terminal pins 90A is interrupted. This provides an indication to the controls for the oven 12 that the heating cycle is to be terminated. This interruption in continuity of the control circuit afforded by the displaced mercury switch 90 continues until such time as the ferrite body 26 cools below its Curie point or a new tray 14 is inserted into the cavity 64 in place of the prior tray.

The electromagnetic energy oven 12 can comprise any one of a number of well known ovens. In one embodiment of the present invention, the oven 12 comprises a Model 56/1139 microwave model marketed by the Tappen Company. This oven has a design output power of 650 watts and operates at 2450 MHz. The conductors 94 through which electrical continuity is selectively established and interrupted by the control assembly 60 are connected to the conventional control 95 provided on the oven 12 to permit the oven to be placed in operation when the usual door interlock is actuated. Thus, operation of the oven 12 is automatically initiated when the tray 14 is properly positioned to actuate the control assembly 60 and the oven door 12B is closed. The oven cavity 64 has a particular energy distribution which is used in allocating heat to the various components of the meal and thus in preparing the template 16.

More specifically, the various food containers or receptacles 42, 44, 46, 48, and 50 are designed in an attempt to impart approximately the desired quantity of heat to each of the food items within the same heating interval. However, the introduction of these food items as electrical loads within a cavity such as the cavity 64 of the oven 12 frequently alters the heating time for the items. Accordingly, when the template 16 for a meal or group of meals is to be prepared, representative food loads are introduced into the cavity 64 on the tray 14 including the sensor assembly 18. This sensor also constitutes an electrical load for the oven 12. The relative positions of the food loads on, for example, a blank template 16, are shifted until such time as all of the food items are heated in the same time. The sensor assembly 18 exceeds its Curie point at the end of this same time interval. In effecting the relative positioning of the electrical loads, a number of factors are considered and utilized.

In the first place, the introduction of the electrical loads afforded by the sensor assembly 18 and the food items introduces a competition between these loads for the energy available in the cavity 64. In the second place, the energy distribution in the cavity 64 is generally not uniform even in the absence of a load, and the insertion of the load further varies the distribution within the oven. By moving the food items relative to each other and to the sensor, it is possible to place those items requiring the greatest amount of heat in the areas in which the greatest amount of electromagnetic energy is possible. By changing the relative positions and the shapes of the food items or containers, the balance of energy transferred to the various components is controlled. By selecting the relative positions of the food items with respect to the sensor, the division of available energy between the food items and the sensor 18 is controlled. When the point is reached at which the sensor assembly 18 exceeds its Curie point and all of the food items reach temperatures suitable for consumption, the locations of the food items are marked, and a large number of templates 16 with the locating openings 16A-16E are produced. Thus, whenever meals are to be prepared, a template 16 can be placed in the tray 14 and the individual food containers 42, 44, 46, 48, and 50 can be taken from storage, assembled on the template, and closed by the cover 22 to facilitate shipment and handling. These meals can be predictably reconstituted merely by insertion into the oven 12 because of the control exercised by the sensor 18 and the control unit 60 in the manner described above.

As set forth above, the relative positions of the food items and the sensor assembly 18 are set using food items of a standard composition and temperature. However, the control exercised by the sensor assembly 18 is capable of insuring proper reconstitution of the meal components 20 even though a substantial number of parameter conditions vary, primarily because the sensor assembly 18 is individually associated with each tray and is subject to the same competition for energy as the food items. As an example, if the tray assembly 10 has been left in an ambient temperature for a sufficient time to elevate the temperature of the food components, the sensor also reaches ambient temperature and thus requires proportionately less energy to exceed its Curie point, thereby reducing the period that electromagnetic energy is applied to the somewhat warmed food items. Other factors resulting in reduced energy input to the cavity 64 such as variations in line voltage or power produce corresponding reductions in the energy applied to the sensor 18 and the food items so that the heating cycle automatically becomes somewhat longer than the standard to insure proper reconstitution before automatic termination of the heating operation. The same compensation can occur, for example, with variations in oven ambient temperature or the size of the portions in the various food containers 42, 44, 46, 48, and 50.

It has also been determined that the sensor assembly 18 can be used to at least partially control the "runaway" effect which frequently arises in reconstituting frozen food. More specifically, there is a substantial change in electrical characteristics of a food item as it changes from a frozen to a thawed state, particularly if appreciable moisture is present. As the frozen food item becomes thawed, it absorbs appreciably more energy than when frozen with the result that boiling or overheating may occur. This effect of absorbing increased quantities of energy changes the energy distribution within the cavity 64. By placing an item exhibiting this effect in a particular position with regard to the sensor assembly 18, the increased absorption of energy by the food article tending to exhibit the "runaway" effect can be made to shift the energy distribution within the cavity 64 to the point at which the sensor assembly 18 receives a greater amount of energy so that the heating operation is terminated more quickly.

It has also been determined that a template such as the template 16 can be used when the food items in the receptacles 42, 44, 46, 48, and 50 are varied without losing the automatic control described above. As an example, pudding can be substituted for the ice cream in the receptacle 46, and various meat items such as chicken can be substituted for the Salisbury steak example in the receptacle 50 referred to above. However, if radically different meals resulting in appreciably different food loads or with different heating requirements are used, it is frequently desirable to provide a number of templates 16 designed for the different types of meals. It is also possible to provide changes in the heating cycle and thus the reconstitution of different meals using either identical or different templates by making use of the embodiments of the invention shown in FIGS. 6 and 7 in which controllable or adjustable means are provided for controlling the amount of electromagnetic energy coupled to the sensor assembly 18.

More specifically and with reference to FIG. 6 of the drawings, therein is illustrated a template 16 constructed in the manner described above. The template 16 includes in its lower left-hand corner an electrically conductive member 100 such as a metal stamping pivotally mounted on the template 16 by a pivot pin 102 in a position that will be adjacent to the sensor assembly 18 when the template 16 is mounted in the tray 14. The member 100 can include an indicator portion 100A with indicia indicated generally as 104 printed on the adjacent surface of the template 16. By shifting the position of the shielding member 100 relative to the underlying sensor assembly 18 (shown in dashed outline in FIG. 6), the amount of electromagnetic energy coupled to the ferrite body 26 can be controlled with a consequent control in the time duration required to elevate the temperature to exceed its Curie point.

FIG. 7 of the drawings illustrates an embodiment of a control for the sensor assembly 18 indicated generally as 106. The unit 106 includes a template 16 made in the manner described above. Provided in conjunction with the template 16 is a plurality of electrically conductive segments indicated generally as 108 of any configuration but illustrated as circles. The segments 108 range from a small area segment 108A to a large area segment 108B. These segments preferably are provided with an adhesive backing.

By placing a suitable one of the segments 108 on the template in a position above or adjacent the sensor assembly 18, additional electromagnetic energy shielding for the sensor assembly 18 is provided, and the time required to heat the ferrite body 26 to exceed its Curie point is controlled. Accordingly, both of the assemblages shown in FIGS. 6 and 7 of the drawings provide means by which a given template 16 can be modified for use with meal components 20 of varying constitution.

FIG. 8 of the drawings illustrates an assembly, indicated generally as 110, of a tray indicated generally as 112 and a food container 114 for controlling the amount of electromagnetic energy imparted to the food within the container 114. The tray 112 can be constructed in a manner similar to the tray 14 in including a bottom wall 112A and side walls 112B having notches for detachably mounting a cardboard or energy transparent template 116. The walls 112A and 112B of the tray arrangement 112 are made from electrically conductive material which provides a shield for electromagnetic energy.

The dish or food container 114 is also formed completely of electrically conducting material except for a section, aperture, or opening 114A which is electrically transparent. In fabrication, the dish 114 can be formed of a metal stamping from aluminum foil with a plastic insert providing the opening or transparent section 114A. After food has been placed in the container 114, the top can be sealed by a layer of aluminum foil which also serves as a moisture barrier. In fabrication the dish or container 114A is formed with a plurality of shouldered sections 114B of different diameters.

To control the quantity of energy imparted to the food load within the container 114, the template 116 is selectively formed with a dish receiving opening 116A of different diameters corresponding to a selected one of the different diameter shoulders 114B on the dish 114. If a small quantity of energy is to be imparted to the food load within the container 114, the opening 116A is formed with a large diameter so that the transparent section 114A is closely disposed adjacent the conductive lower wall 112A of the tray. This provides a small port for energy. Alternatively, if a larger quantity of energy is to be imparted to the food load within the container 114, the opening 116A is formed with a small diameter corresponding to the small diameter shoulder 114B on the dish. When the small diameter shoulder 114B on the container 114 is disposed within the locating opening 116A, the transparent section 114A is spaced a greater distance from the electrically conductive or shielding lower wall 112A, and a larger area coupling between the food load and the energy within the cavity 64 is provided.

The sensor 18 and the control 60 are described above in conjunction with controlling the heating of a food load. This control arrangement can also be used to control a heating means such as the oven 12 to heat loads of other kinds or types of articles. As an example, the articles could comprise plastic, rubber, or pharmaceutical items that are to be warmed or thawed. The article loads could include a single article or a number of articles requiring differential or uniform heating.

Although the present invention has been described with reference to a number of illustrative embodiments thereof, it should be understood that numerous other modifications and embodiments can be devised by those skilled in the art that will fall within the spirit and scope of the principles of this invention.

What is claimed and desired to be secured by Letters Patent of the United States is:

1. The method of preparing a meal including a plurality of food items for concurrent equal duration heating in the cavity of a microwave oven under the control of a microwave energy absorbing sensor which exhibits a detectable change in a characterisitc thereof upon receiving a given quantity of microwave energy, which method comprises the steps of:

selectively shielding at least a portion of said food items with electrically conductive material to provide a generally uniform heating time to bring each item to a condition suitable for consumption, positioning said food items within the microwave oven and at locations relative to said sensor and to one another so that said food items all receive an amount of microwave energy which is sufficient to heat said food items within the same time interval that said sensor requires to exhibit said detectable change, and preparing a carrier for detachably holding said food items in said relative positions.

2. The method of claim 1 which includes the steps of preparing a template having openings therein of a configuration corresponding to said food items and effective to position said items at said relative positions, and mounting said template on a food carrying tray which has one of said sensors mounted thereon in such position that said sensor exhibits said detectable change within said time interval when said tray is positioned at a given location within said oven.

3. The method of claim 2 which includes the step of adjustably shielding said sensor on said tray so as to vary said time interval.

4. The method of claim 1 which includes the steps of positioning a member on said carrier to alter the microwave energy coupled to said sensor, thereby to adjust the time required for said sensor to exhibit said detectable change.

5. The method of claim 1, wherein at least one of said food items is frozen when positioned in said oven and absorbs a substantially greater amount of microwave energy when it is thawed, and positioning said one frozen food item relative to said sensor so that thawing thereof causes a shift in the energy distribution within the oven and increases the energy per unit of time absorbed by said sensor, thereby to shorten said time interval.

* * * * *